May 21, 1968 H. F. BOPP ET AL 3,384,508
METHOD OF GLAZING SEMICRYSTALLINE GLASS-CERAMIC ARTICLES
AND RESULTANT INTERMEDIATE LAYER CONTAINING COMPOSITE
Filed Jan. 8, 1964 2 Sheets-Sheet 1
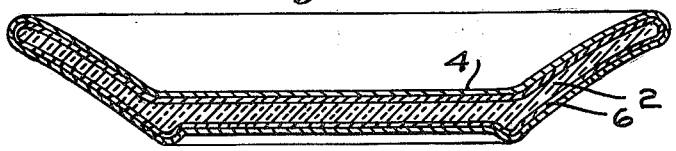
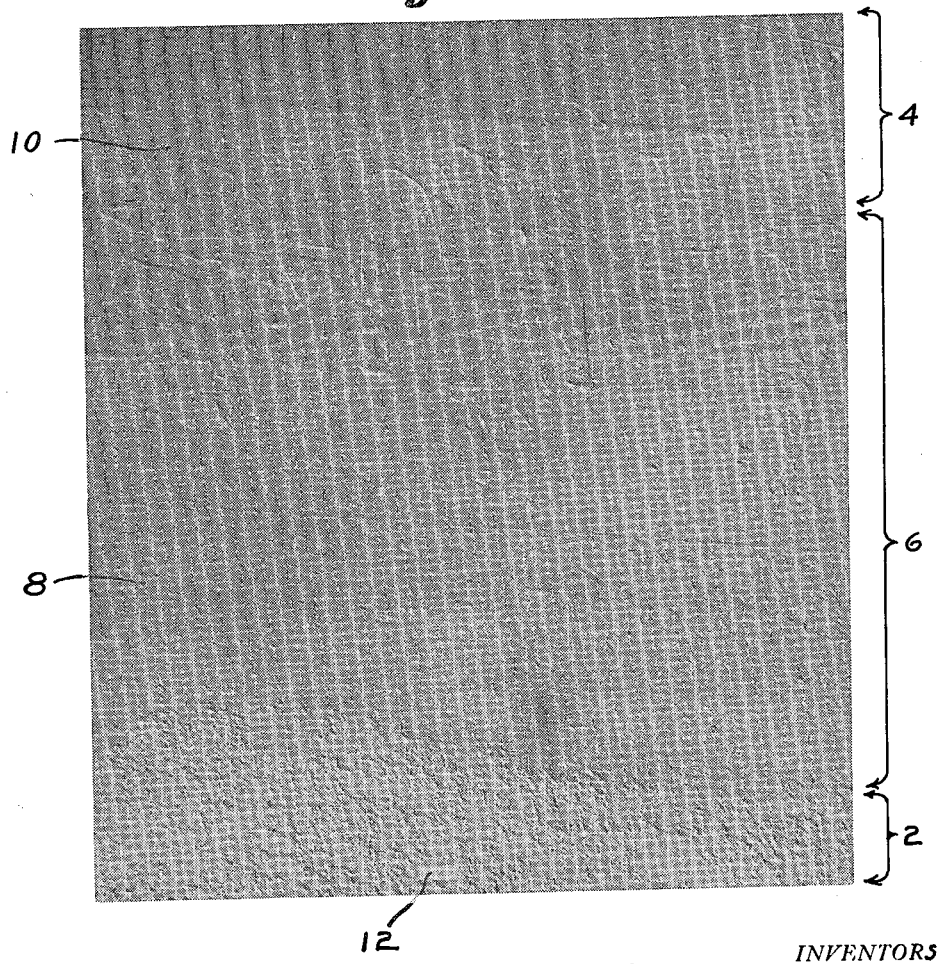
INVENTORS
HAROLD F. BOPP
JOHN E. MEGLES AND
JOSEPH W. MORRISSEY
BY Clarence R. Patty
ATTORNEY INVENTORS
Harold F. Bopp, John E. Megles, Joseph W. Morrissey

ATTORNEY

3,384,508
METHOD OF GLAZING SEMICRYSTALLINE
GLASS-CERAMIC ARTICLES AND RESULT-
ANT INTERMEDIATE LAYER CONTAINING
COMPOSITE
Harold F. Bopp, John E. Megles, and Joseph W. Morrissey, Corning, N.Y., assignors to Corning Glass Works, Corning, N.Y., a corporation of New York
Continuation-in-part of application Ser. No. 175,904, Feb. 26, 1962. This application Jan. 8, 1964, Ser. No. 339,061
8 Claims. (Cl. 117—123)

ABSTRACT OF THE DISCLOSURE

This invention relates to the glazing of glass-ceramic articles and, more particularly, to the application of glazes which react with the glass-ceramic article to form a layer therebetween comprising crystals extending into and thereby tightly bonding the glaze to the glass-ceramic article.

Figure 3:
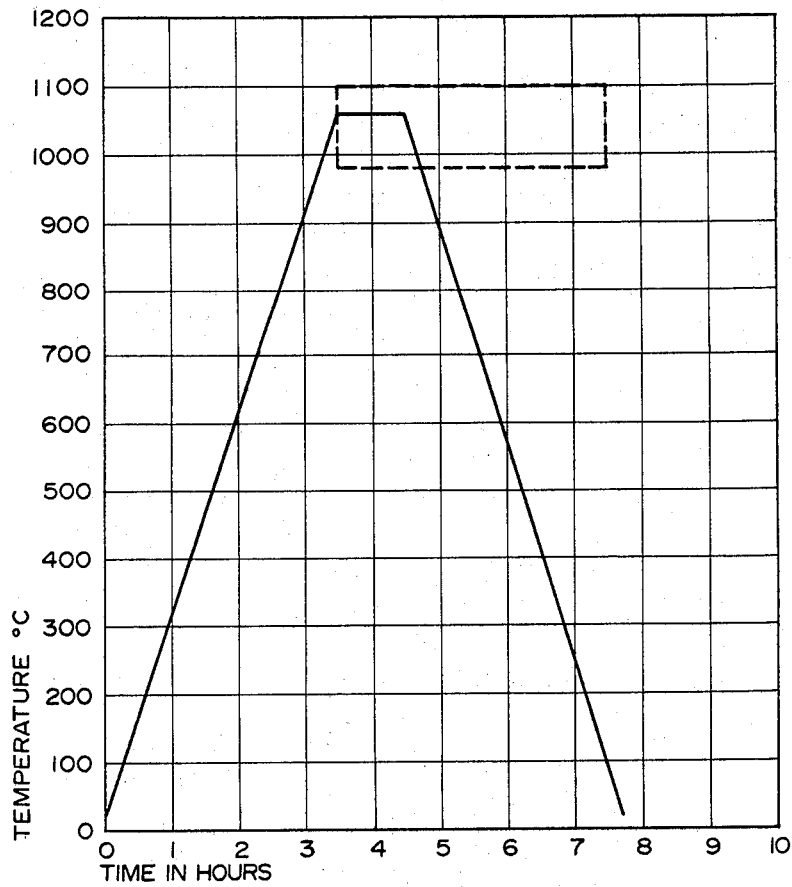

This application is a continuation-in-part of our pending application, Ser. No. 175,904, filed Feb. 26, 1962, now abandoned.

It has heretofore been known that semicrystalline glass ceramic articles can be made by the heat treatment of articles of glass of a wide variety of compositions to cause a major proportion of the glass to be precipitated in the crystalline state, thereby yielding semicrystalline ceramic bodies such as are described in United States Patent No. 2,920,971 and patent application Ser. No. 852,159 filed Nov. 23, 1959 by H. D. Kivlighn. As is explained therein, semicrystalline ceramic bodies or glass-ceramics, as they have been frequently termed, are commonly produced through a three-step process. A glass-forming batch to which a nucleating agent may be added is melted, this melt is simultaneously cooled to a glass and a body of the desired configuration shaped therefrom, and then this glass body is heat treated in a particular manner to cause the body to crystallize in situ. The heat treatment converts the glass into a body composed of substantially uniformly fine-grained crystals dispersed relatively homogeneously throughout a glassy matrix and comprising a major proportion of the mass of the body. The semicrystalline ceramic body normally exhibits physical properties differing considerably from those of the base glass, being in reality a composite of glass and crystals. And as the crystallization of the glass occurs in situ, a substantially homogeneous body of fine crystals can be produced which is free of voids and non-porous. While such bodies have many desirable properties, for some applications such as dinnerware, where a decorative and highly lustrous surface is demanded, it would be desirable to apply an amorphous ceramic coating to the surface thereof.

The principal object of this invention is to provide a composite ceramic body consisting of a semicrystalline glass ceramic underbody with an adherent coating thereon.

Another object of this invention is to provide a glazed semicrystalline glass ceramic article which is suitable for use in serving food preparations thereon.

A still further object is to provide a glazed semicrystalline glass ceramic article having great strength.

We have now found that the principal object of this invention can be achieved in a composite ceramic article consisting in combination of a base of a semicyrstalline glass ceramic, an amorphous glaze and an intermediate layer between said base and said glaze comprising crystals extending into said amorphous glaze and interlocking therewith.

In FIG. 1 is shown in cross-section a composite ceramic body according to this invention comprising a semicrystalline underbody 2, an amorphous glaze 4, shown in exaggerated thickness, and an intermediate layer 6, also shown greatly exaggerated, between said base 2 and said glaze 4. In FIG. 2, which is an electron micrograph of a portion of the composite article of FIG. 1, is shown that the intermediate layer 6, between outer layer 4, and the base 2, comprises crystals 8 which entered into the glaze 4 in the form of elongated dendrites 10 which interlock with the glaze 4. The magnification is indicated by the inclusion in FIG. 2 of reference bar 12 which indicates the length of one micron. As can be appreciated from a study of such electron micrograph, the glaze is very adherent to the underbody because of this mechanical interlocking achieved by this intermediate layer.

The composite ceramic body shown in FIG. 1 can be produced in accordance with conventional glazing techniques whereby the desired glaze frit and/or glaze components are compounded and mixed with a suitable carrier so that they may be applied to the base by spraying or dipping and thereafter firing the coated base to a temperature sufficiently high to mature the glaze thereon. Although we have applied a wide variety of glaze compositions to semicrystalline ceramic bases, we have found that the unique interlayer results from all such compositions, regardless of the particular constituents or amounts thereof, except that the total amount of the alkali metal oxides (lithium oxide, sodium oxide, and potassium oxide) must be limited to less than 16% by weight of the glaze composition in order to attain the desired result. It appears that there is a reaction between the frit and the semicrystalline body during the glaze-firing process whereby such crystalline interlayer is formed.

We have furthermore found that glazes consisting essentially on a weight percent basis of 1.5–16% Na₂O, 3–10% Al₂O₃, 4–19% B₂O₃, 40–70% SiO₂, and optionally containing up to 8% K₂O, 12% CaO, 40% PbO, 5% ZrO₂, 5% CdO, 8.5% CaF₂, 2% ZnO, and 9% MgO, the total of the alkali metal oxides not exceeding 16%, are particularly suitable for use on semicrystalline ceramic bodies for the production of dinnerware because such glazes not only result in the formation of the desired intermediate crystalline layer but also have a sufficiently low maturing temperature to permit curing of the glaze without undesirable deformation of the article, possess adequate durability against acid or chemical attack of the type usually incurred in contact with comestibles, and possess thermal expansion coefficients which are compatible with such semicrystaline bodies. By compatible thermal expansion coefficient, we mean the coefficient of the glaze is from 40% to 100% of that of the body, as more fully explained hereinafter.

The above defined ranges of the essential constituents of suitable glazes are critical to produce the desired results. It is necessary to utilize to the stated minimum amounts of Na₂O and B₂O₃, and the maximum amounts of SiO₂ and Al₂O₃ to produce a glaze which can be fired to a dense non-porous condition without utilizing such a high temperature as to cause deformation of the semicrystalline substrate body. More than 16% Na₂O and/or a total of 16% Na₂O+K₂O prevents the formation of the desired interlayer and may also produce cratering at the interface between the glaze and the semicrystalline body. More than 19% B₂O₃ also produces glazes with too low chemical durability while less than 40% SiO₂ produces the same undesirable result. At least 3% Al₂O₃ is required in order to produce the requisite abrasion resistance in the glaze.

The optional constituents may be included in the glaze up to the stated amounts in order to improve various properties. While K₂O can be utilized as a partial substitute for $Na_2O$ to reduce the fusing temperature, more than 8% reduces the chemical durability to an undesirable level, and the presence of CaO improves the appearance of underglaze colors but more than 12% tends to promote cratering at the glaze-body interface. Lead oxide improves the fusing characteristics of the glaze up to 40%, but greater amounts tend to produce a yellow discoloration in the glaze and lowers abrasion resistance. Up to about 1% $CaF_2$ improves the fusing characteristics of the glaze but more than 8.5% results in a glaze which does not possess the requisite chemical durability. Zirconia and cadmium oxide may each be advantageously present in the glaze in amounts of up to 5% to improve the chemical durability thereof. Likewise, zinc oxide and magnesia may be included up to the stated amounts to improve the firing characteristics of the glaze but greater amounts tend to produce undesirable effects on decorating colors.

Examples of glazes which are suitable for the production of dinnerware from semicrystalline articles are set forth in weight percent in Table I along with the thermal expansion coefficient of each such glaze.

p.s.i. Additionally, the formation of the interlayer whereby crystals are interlocked with the amorphous glaze, appears to make the glaze more adherent to the base and to lower the tendency of the glaze to shiver.

We have found that while glazes possessing thermal expansion coefficients between that of the base and 30% less than that of the base (that is, the expansion coefficient of the glaze is 70–100% that of the base) can be utilized to produce useful articles, the difference must be at least 30% to achieve a doubling of the strength of the body. However, glazes which have an expansion coefficient which is less than that of the semicrystalline base by a factor of over 60% may shiver and hence are not effective for the present purposes. Likewise, when the glazes are greater than 10 mils in thickness and have a thermal expansion coefficient of between 30% and 60% less than that of the body, they also tend to increase the violence of the breakage if the article is subjected to forces in excess of its breaking strength. On the other hand, such glazes must have a thickness of at least 4 mils to impart the full strengthening effect to the composite body.

Glazes having the aforementioned compositions are

TABLE I

| | 1 | 2 | 3 | 4 | 5 | 6 | 7 | 8 | 9 |
|---|---|---|---|---|---|---|---|---|---|
| $SiO_2$ | 46.3 | 47.7 | 40.7 | 46.1 | 47.7 | 47.7 | 69 | 46.8 | 69 |
| $Na_2O$ | 3.8 | 4.0 | 1.9 | 2.7 | 4.0 | 3.0 | 15 | 5.2 | 11 |
| $Al_2O_3$ | 6.6 | 7.4 | 3.5 | 4.4 | 7.4 | 7.4 | 5 | 9.2 | 5 |
| $B_2O_3$ | 14.8 | 9.8 | 11.1 | 18.2 | 9.8 | 9.8 | 11 | 10.6 | 11 |
| $K_2O$ | 1.5 | 1.0 | 1.4 | 1.0 | | 1.0 | | 1.9 | |
| CaO | 11.8 | 8.2 | 9.8 | 16.5 | 9.2 | 7.9 | | | 4 |
| $ZrO_2$ | 0.5 | 0.8 | | 1.0 | 0.8 | 0.8 | | | |
| CdO | 0.5 | | | 1.0 | | 0.3 | | | |
| PbO | 14.2 | 21.1 | 31.6 | 9.1 | 21.1 | 21.1 | | 17.8 | |
| $CaF_2$ | | | | | | 1.0 | | 8.5 | |
| Expan. Coeff. per °C. (×10⁷) | 67 | 65 | 69 | 65 | 62 | 63 | 63 | 75 | 70 |

We have additionally discovered that an exceedingly strong composite ceramic body according to this invention results when the glaze possesses a thermal expansion coefficient of 30% to 60% less than that of the semicrystalline body to which it is applied and has a matured thickness of from 4–10 mils. While glazing techniques have been utilized for the strengthening of glass, porcelain, or sintered ceramic bodies by utilizing a glaze having a thermal expansion coefficient of up to 25% less than that of the base body, attempts to utilize enamels or glazes having a greater difference in thermal expansion coefficient have not been possible because of the fact that the glaze either crazes or the base body disintegrates because of the forces exerted thereon due to the differences in thermal expansion coefficient.

We believe that the reason that it is possible to utilize glazes having such low expansion coefficients in relation to the base body is due to a combination of factors. First of all, the semicrystalline ceramic base to which the glaze is applied is essentially non-porous, the crystals in the base are relatively uniform in size and homogeneously distributed throughout the body, and the material has an inherent modulus of rupture, when measured in accordance with conventional techniques, or at least 10,000 prepared in accordance with usual practice by first producing a frit by melting conventional batch materials in such proportion as to produce the desired frit composition at a temperature of about 1450°–1550° C. for about 4–6 hours and thereafter quenching the molten batch by pouring it into water.

The frit is then ground or crushed by a ball mill or other suitable means and thereby reduced to a finely divided state, preferably so that all of the frit will pass through a standard United States 250-mesh screen. The finely divided frit is then mixed with a small amount of a binder, such as clay and/or sugar and/or synthetic organic polymers, and a liquid vehicle to produce a slip of the desired consistency for coating the underbody.

We have discovered that glazes of the above-defined compositions can be utilized with substantially all semicrystalline materials, there occurring therebetween the necessary reaction between the frit and the glass-ceramic substrate to produce the crystalline interlayer. Thus, Table II sets forth in weight percent the compositions of examples which are illustrative of the wide variety of semicrystalline materials which are amenable to our process, other examples being recorded in the above-mentioned patent and patent application.

TABLE II

| | 1 | 2 | 3 | 4 | 5 | 6 | 7 | 8 | 9 | 10 | 11 | 12 | 13 |
|---|---|---|---|---|---|---|---|---|---|---|---|---|---|
| $SiO_2$ | 56.0 | 71.0 | 25.0 | 56.0 | 40.0 | 48.0 | 43.4 | 63.0 | 20.0 | 35.0 | 25.0 | 20.0 | 50.0 |
| $Al_2O_3$ | 20.0 | 18.0 | 45.0 | 40.0 | 40.0 | 19.0 | 30.3 | 20.0 | 45.0 | 50.0 | 45.0 | 60.0 | 26.1 |
| $TiO_2$ | 9.0 | 4.5 | | | | 10.0 | 5.7 | | | | | | 4.5 |
| MgO | 15.0 | 3.0 | | | 22.0 | | 9.0 | | 13.0 | | | | 2.2 |
| ZnO | | 1.0 | | | | | | | | | | | |
| $Li_2O$ | | 2.5 | | | | | | | | | | | |
| $P_2O_5$ | | | 13.0 | | | | | 15.0 | | 10.0 | 16.0 | | |
| $ZrO_2$ | | | 15.0 | | | | | 8.0 | 17.0 | | 15.0 | 2.0 | |
| $Na_2O$ | | | 2.0 | | 1.0 | 14.1 | | | | | | | 17.2 |
| $K_2O$ | | | | 4 | | | | | | 3.0 | 2.0 | | |
| BaO | | | | | | 20.0 | | 6.5 | | | 5.0 | 2.0 | |

As has been explained hereinabove, the use of glazes is particularly important in the dinnerware field. Glass-ceramics wherein nepheline is present as one of the primary crystal phases, and especially where nepheline and celsian together constitute the primary phases, possess certain physical properties making them excellent bodies for such service. We have discovered that these semicrystalline ceramic bodies are particularly suitable with the glazes of this invention and an exceptionally strong interlocking crystalline intermediate layer results through the reaction of the glaze with the glass-ceramic substrate.

An example of one type of suitable semicrystalline underbodies, which contain nepheline as one of the primary phases, are those produced in accordance with the method described in co-pending application Ser. No. 852,159, filed Nov. 23, 1959, by H. D. Kivlighn. Generally, these bodies are produced by melting a composition consisting essentially on a mole percent basis of 50–68% $SiO_2$, 16–34% $Al_2O_3$, 15–34% $Na_2O$, 0–5% $CaO$, 0–6% $K_2O$, the total $Na_2O$, $CaO$, and $K_2O$ being not over 34%, the mole ratio of

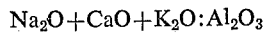

$$Na_2O+CaO+K_2O:Al_2O_3$$

not exceeding 1.7, and containing as nucleating agents at least one titanate of a divalent metal oxide selected from the group consisting of iron oxide, cobalt oxide, cadmium oxide, zinc oxide, nickel oxide, manganese oxide, and magnesium oxide in which the proportion of the $TiO_2$ constituent is between 2.9% and 12% and the proportion of the divalent metal oxide constituent being between 1.9% and 10%, the total of the constituents of the titanates being at least 6%, forming the molten glass to desired shape, and thereafter heat treating the glass body by exposing it to a temperature between 800° C. and 1150° C. for a sufficient time to cause a major portion of the glass to crystallize as is explained in the aforementioned application.

An especially useful dinnerware product of this invention is produced by utilizing an article of a semicrystalline glass ceramic having the composition of Example 13 of Table II.

The semicrystalline base article is made by melting a suitable batch to form a glass, forming the glass to the article of the desired shape, and thereafter heat treating the glass article to convert it to the semicrystalline state, in accordance with the disclosure in the aforementioned patent application and specifically that portion dealing with Example 43 therein. The semicrystalline body produced thereby has an expansion coefficient of about $120 \times 10^{-7}/°$ C. and a modulus of rupture of about 15,000 p.s.i.

The preferred embodiment of this invention is produced by utilizing a glass-ceramic article having the composition of Example 7 of Table II. The underbody is made by melting the necessary batch, cooling the melt to a glass and forming a shape therefrom, and thereafter heat treating the glass body to convert it to the semicrystalline state by heating it to 800° C. at about 5° C./minute, maintaining thereat for 2 hours, then raising the temperature of the body at about 5° C./minute to 1070° C. and holding thereat for 4 hours. The glass-ceramic body resulting thereby has an expansion coefficient of about $98 \times 10^{-7}/°$ C. and a modulus of rupture of about 12,000 p.s.i.

The preferred glaze for such semicrystalline base material is Example 2 in Table I. This glaze has a softening point at 702° C. and an annealing point of 549° C. and expansion of $65.3 \times 10^{-7}/°$ C. Such glaze is prepared by first making a suitable frit by melting a batch comprising the following ingredients in parts by weight:

| | |
|---|---|
| Kona feldspar | 15.5 |
| Lunday clay | 3.9 |
| Borax (crystalline) | 16.1 |
| Boracic acid (flaky) | 4.8 |
| $CaCO_3$ | 12.3 |
| $Pb_3O_4$ | 19.0 |
| $SiO_2$ | 27.7 |
| $ZrO_2$ | .7 |

This batch is melted at a temperature of about 1450°–1550° C. for from 4–6 hours and thereafter quenched by pouring into water. The frit is then ground by a ball mill or other suitable means and thereby reduced to a fineness such that all of the frit will pass through a standard United States 250-mesh screen. The ground frit is then mixed with Lunday clay in a proportion of 95 parts by weight of frit with 6 parts by weight of clay, along with about 3 parts of Carbowax 20M (a polyglycol having an average molecular weight of about 20,000) and 6 parts by weight of sugar and sufficient water to impart the desired consistency to the slip to allow spraying thereof.

The slip is then applied to the surface of the semicrystalline article by spraying the slip thereon to deposit a coating when dry of about 5–12 mils on the semicrystalline article. The glaze is then fired on by heating the coated article at a rate preferably not exceeding about 5° C./minute to a temperature ranging from about 980°–1100° C., desirably about 1060° C., maintaining the body at this temperature for a period of time sufficient to fuse and mature the glaze, normally about ½–4 hours, and preferably 1–2 hours, and then cooling the glazed article to room temperature at a rate preferably not exceeding about 5° C./minute. Heating rates greater than 5° C./minute have been utilized successfully in some applications but frequently seeds have been observed which are absent when slower rates are utilized. Likewise, cooling rates faster than 5° C./minute have been employed successfully in some instances but frequently unwanted residual stresses are set up in the body which can result in greatly weakening the body. FIGURE 3 records a time-temperature curve for the preferred glazing treatment of the invention wherein after the glass-forming batch has been melted, the melt shaped and cooled to room temperature and a coating of glaze deposited on the surface thereof, the coated article is then fired as follows: the article is heated at about 5° C./minute to 1060° C., maintained thereat for 1 hour, and then cooled at about 5° C./minute to room temperature. The area enclosed within the dotted lines represents ranges of times and temperature generally useful in the invention.

We have found that articles, such as cups, saucers, plates, and the like, utilizing a semicrystalline ceramic underbody of the composition of Example 13 of Table II, when treated in accordance with our invention possess an average modulus of rupture of about 37,000 p.s.i. as compared to a modulus of rupture for the unglazed semicrystalline article of about 13,000 p.s.i.

Finally, dinnerware produced from our preferred base glass-ceramic composition exhibits an average modulus of rupture of about 35,000 p.s.i. when glazed in accordance with our invention.

We claim:
1. A composite ceramic article comprising in combination a base of an essentially on-porous semicrystalline ceramic body, an amorphous glaze having a thermal expansion coefficient 40–100% of that of the semicrystalline ceramic base and consisting essentially, on a weight percent basis, of 1.5–16% $Na_2O$, 3–10% $Al_2O_3$, 4–19% $B_2O_3$, 40–70% $SiO_2$, 0–8% $K_2O$, 0–12% $CaO$, 0–40% $PbO$, 0–5% $ZrO_2$, 0–5% $CdO$, 0–8.5% $CaF_2$, 0–2% $ZnO$, and 0–9% $MgO$, the total of the alkali metal oxides not exceeding 16%, and an intermediate layer between said base and said glaze comprising crystals extending into said glaze and interlocking therewith.

2. A composite ceramic article according to claim 1 wherein said semicrystalline ceramic body contains nepheline as one of the primary crystal phases.

3. A composite ceramic article according to claim 1 wherein said semicrystalline ceramic body contains nepheline and celsian as the primary crystal phases.

4. A strong composite ceramic article according to claim 1 wherein said glaze is from 4–10 mils thick and has a thermal expansion coefficient of from 30–60% less than that of said semicrystalline ceramic base.

5. A method of making a composite ceramic article comprising the steps of applying an amorphous glaze coating to the surface of an essentially non porous semicrystalling ceramic base, said glaze having a thermal expansion coefficient 40–100% of that of the semicrystalline ceramic base and consisting essentially, on a weight percent basis, of 1.5–16% $Na_2O$, 3–10% $Al_3O_2$, 4–19% $B_2O_3$, 40–70% $SiO_2$, 0–8% $K_2O$, 0–12% CaO, 0–40% PbO, 0–5% $ZrO_2$, 0–5% CdO, 0–8.5% $CaF_2$, 0–2% ZnO, and 0–9% MgO, the total of the alkali metal oxides not exceeding 16%, heating the coated base to a temperature of about 980°–1100° C., maintaining thereat for a period of time sufficient to fuse and mature the glaze, and thereafter cooling the glazed article, whereby the fusing of the glaze produces a layer between said glaze and said base comprising crystals extending into said glaze and interlocking therewith.

6. A method according to claim 5 wherein the time sufficient to fuse and mature the glaze is about ½–4 hours.

7. A method of making a composite ceramic article comprising the steps of applying an amorphous glaze coating to the surface of an article of glass which can be crystallized in situ to an essentially non-porous semicrystalline ceramic article, said glaze having a thermal expansion coefficient 40–100% of that of the semicrystalline ceramic article and consisting essentially, on a weight percent basis, of 1.5–16% $Na_2O$, 3–10% $Al_2O_3$, 4–19% $B_2O_3$, 40–70% $SiO_2$, 0–8% $K_2O$, 0–12% CaO, 0–40% PbO, 0–5% $ZrO_2$, 0–5% CdO, 0–8.5% $CaF_2$, 0–2% ZnO, and 0–9% MgO, the total of the alkali metal oxides not exceeding 16%, heating the coated glass article to a temperature of about 980°–1100° C., maintaining thereat for a period of time sufficient to crystallize the glass article in situ and to fuse and mature said glaze, whereby the fusing of the glaze produces a layer between said glaze and said crystallized article comprising crystals extending into said glaze and interlocking therewith.

8. A method according to claim 7 wherein the time sufficient to crystallize said glass article in situ and to fuse and mature the glaze is about ½–4 hours.

References Cited

UNITED STATES PATENTS

| 2,157,100 | 5/1959 | Rowland | 106—48 X |
| 2,294,931 | 9/1942 | Paquet | 106—48 |
| 2,832,695 | 4/1958 | Compton et al. | 117—125 X |
| 3,146,114 | 8/1964 | Kivlighn | 106—39 |
| 3,220,870 | 11/1965 | Loehrke | 117—125 X |

FOREIGN PATENTS

| 1,082,016 | 5/1960 | Germany. |

RALPH S. KENDALL, *Primary Examiner.*

ALFRED L. LEAVITT, *Examiner.*

H. COHEN, *Assistant Examiner.*